United States Patent
Masters et al.

(10) Patent No.: US 6,330,278 B1
(45) Date of Patent: Dec. 11, 2001

(54) DYNAMIC ADAPTIVE MODULATION NEGOTIATION FOR POINT-TO-POINT TERRESTRIAL LINKS

(75) Inventors: Jeffrey Tony Masters, Glen Allen; Erol Kenneth Yurtkuran; Victor Hugo Molina, both of Richmond; Shin-Fang Ho, Glen Allen, all of VA (US)

(73) Assignee: Integrity Broadband Networks, Inc., Richmond, VA (US)

( * ) Notice: Subject to any disclaimer, the term of this patent is extended or adjusted under 35 U.S.C. 154(b) by 0 days.

(21) Appl. No.: 09/362,043

(22) Filed: Jul. 28, 1999

(51) Int. Cl.[7] ...................................................... H04B 1/38
(52) U.S. Cl. ........................................... 375/223; 375/264
(58) Field of Search .................................... 375/222, 223, 375/261, 264

(56) References Cited

U.S. PATENT DOCUMENTS

| | | | |
|---|---|---|---|
| 5,321,725 | * 6/1994 | Paik et al. | 375/265 |
| 5,475,711 | * 12/1995 | Betts et al. | 375/240 |
| 5,828,677 | * 10/1998 | Sayeed et al. | 714/774 |
| 5,914,959 | * 6/1999 | Marchetto et al. | 370/468 |
| 5,940,439 | * 8/1999 | Kleider et al. | 375/225 |
| 5,982,813 | * 11/1999 | Dutta et al. | 375/219 |

OTHER PUBLICATIONS

Timothy Pratt, et al., Satellite Communications, Copyright © 1968, by John Wiley & Sons, Inc., pp. 327–343.
ITU–T Recommendation V.8, International Telecommunication Union, Series V: Data Communication Over the Telephone Network, Feb., 1998, p. 29.
Bernard Sklar, Digital Communications, Fundamentals and Applications, © 1988 by PTR Prentice Hall, Inc., pp. 394–395.

* cited by examiner

*Primary Examiner*—Don N. Vo
(74) *Attorney, Agent, or Firm*—Wolf, Greenfield & Sacks, P.C.

(57) ABSTRACT

A transmission device that transmits a signal along a link and method therefor that includes a forward error correction encoder unit to insert error correction information into the signal transmitted along a link and output a corresponding encoded signal. A modulation unit variably modulates the encoded signal and outputs a modulated signal, having a corresponding quadrature amplitude modulation index, to the receiving device. A control unit variably controls the inserted forward error correction information and the quadrature amplitude modulation index based on link quality information with respect to substantially the entire link to increase throughput during periods of reduced environmental degradation.

33 Claims, 6 Drawing Sheets

DYNAMIC ADAPTIVE MODULATION NEGOTIATION FOR POINT-TO-POINT TERRESTRIAL LINKS

BACKGROUND OF THE INVENTION

1. Field of the Invention

The present invention relates to a wireless modem, and more particularly, the present invention relates to a wireless modem that improves link characteristics between modems during periods of reduced environmental degradation of the link, and method therefor.

2. Description of the Related Art

Although there are several link dependencies that must necessarily be taken into consideration during the transmission of a carrier signal from a wireless transmitter to a wireless receiver, channel capacity is primarily dependent upon signal-to-noise ratio, or "SNR". Typically, as the SNR decreases, the channel capacity decreases, causing a link formed between the transmitter and the receiver to be degraded, corrupting the transfer rate of the corresponding carrier signal. On the other hand, as the SNR increases, the channel capacity increases, resulting in improved transfer rate of the carrier signal.

At the same time, while there are several factors that have a tendency to cause the SNR to decrease, environmental degradation, such as rain, snow, fog, and other non-transient man-made interference sources tend to be major factors causing a decrease in SNR. For example, individual raindrops absorb/scatter energy from radio waves and a certain amount of energy in the waves is scattered away from the propagation path. Rain attenuation and depolarization of a transmitted carrier signal particularly occurs during periods of intense rainfall, causing the SNR to degrade.

The level of the effects of these interactions between the carrier signal and the rainfall depend on both the number of raindrops encountered by the carrier signal, and the distribution of the size and shapes of the raindrops, both of which depend on the rate of the rainfall. In a wireless modem operating over a carrier at millimeter wave frequencies, where the wavelength of the carrier is close to the size of a raindrop, or on the order of a couple of millimeters, a raindrop is substantial enough in size to degrade the link during periods of moderate to intense rainfall. When the wireless broadband link is a terrestrial link, the entire link may be covered in rain, depending on the size of the associated storm, and therefore substantially the entire link is degraded.

As a result, in order to insure successful data transmission along a link when implementing wireless broadband links in the wireless modem, it is important that the links be engineered to operate during the period of the year in which the rainfall is the most intense. Therefore, since the most intense rainfall occurs typically during less than one percent of a given year, additional capacity of the carrier is available for more than ninety-nine percent of the time and cannot be used.

FIG. 1 is a graphical representation of a relationship between the SNR and rainfall over time. Environmental degradation of a signal that occurs, for example, during an intense snowfall in January is indicated by a downward extending spike 20$a$. In addition, environmental degradation of the signal that occurs during intense rainfall in June and July is indicated by downward extending spikes 20$b$–$d$, and environmental degradation of the signal that occurs during an intense snow storm in December is indicated by a downward extending spike 20$e$. Although degradation of a carrier signal due to intense snow or rainfall might only occur less than one percent of the time in a given year, for a link to be reliable it must be engineered to always operate throughout the year at an SNR corresponding to the periods of intense snow or rainfall. Accordingly, the link must be engineered to always operate at the lowest SNR, indicated by a horizontal line 22.

During the remaining ninety-nine percent of the year, when environmental degradation is no longer a factor, and therefore when the SNR that can be tolerated is greatest, indicated by a line 24, additional or excess capacity is available that cannot be used. This excess capacity is illustrated by a hashed region located between where the SNR can be tolerated, line 24, and the engineered level of the SNR, line 20. Therefore, the excess capacity is wasted ninety-nine percent of the time during the year, resulting in reduced throughput.

BRIEF SUMMARY OF THE INVENTION

It is an object of the present invention to provide a wireless modem and method therefor that transmits a signal having a greater throughput during periods when there are no effects on the carrier signal resulting from environmental degradation of a terrestrial link.

It is a further object of the present invention to provide a wireless modem and method therefor that negotiates modulation of a carrier signal along a link in response to changes in effects of environmental degradation on the link.

It is a still further object of the present invention to provide a wireless modem and method therefor that negotiates modulation of a carrier signal along a link in response to changes in effects of environmental degradation on the link, while minimizing the impact of the negotiation on data transmitted along the carrier signal.

Objects of the invention are achieved by a wireless modem that includes a controller that samples a number of parameters of a wireless terrestrial signal and a data adjusting unit that adjusts data throughput responsive to the parameters.

Further objects of the invention are achieved by a device for transmitting a signal to a remote device and receiving a signal transmitted from the remote device that includes a transmitting unit that generates the signal transmitted to the remote device, and a receiving unit that receives the signal transmitted from the remote device and outputs remote modulation variation information included in the received signal. The receiving device also generates link quality information corresponding to the received signal, and a control unit generates a modulation change command packet instructing the remote device to change to a quadrature amplitude modulation index corresponding to the link quality information. The control unit variably controls the generation of the signal by the transmitter according to the remote modulation variation information output from the receiving unit.

According to the present invention, the link quality information corresponds to environmental degradation of the signal. The quadrature amplitude modulation index is increased in response to the link quality information indicating reduced degradation of the link, and decreased in response to the link quality information indicating degradation of the link.

Further objects of the invention are achieved by a wireless modem for transmitting a signal to a remote device and receiving a signal transmitted by the remote device that includes a forward error correction encoder unit that inserts error correction information to the signal transmitted by the wireless modem and outputs a corresponding encoded signal. A modulation unit variably modulates the encoded signal and outputs a modulated signal having a corresponding quadrature amplitude modulation index to the remote device. A demodulating unit demodulates the signal transmitted by the remote device and outputs a corresponding demodulated signal, and a control unit generates a modulation change command packet instructing the remote device to change quadrature amplitude modulation index corresponding to link quality information generated by the demodulating unit and the forward error correction decoder unit, and variably controls the inserted forward error correction information and the quadrature amplitude modulation index based on remote modulation variation information included in the signal received from the remote device.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
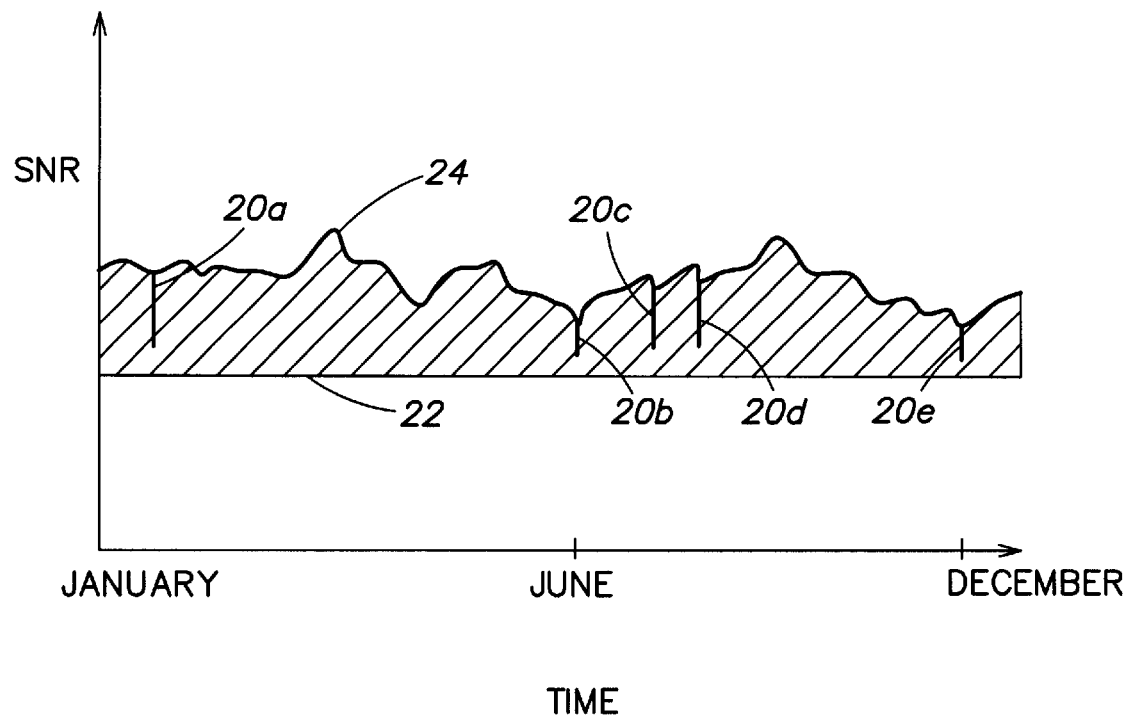
FIG. 1 is a graphical representation of a relationship between signal-to-noise ratio of a signal and rainfall over time.

Reference will now be made in detail to the preferred embodiments of the present invention, examples of which are illustrated in the accompanying drawings, wherein like reference numerals refer to like elements throughout.

Figure 2:
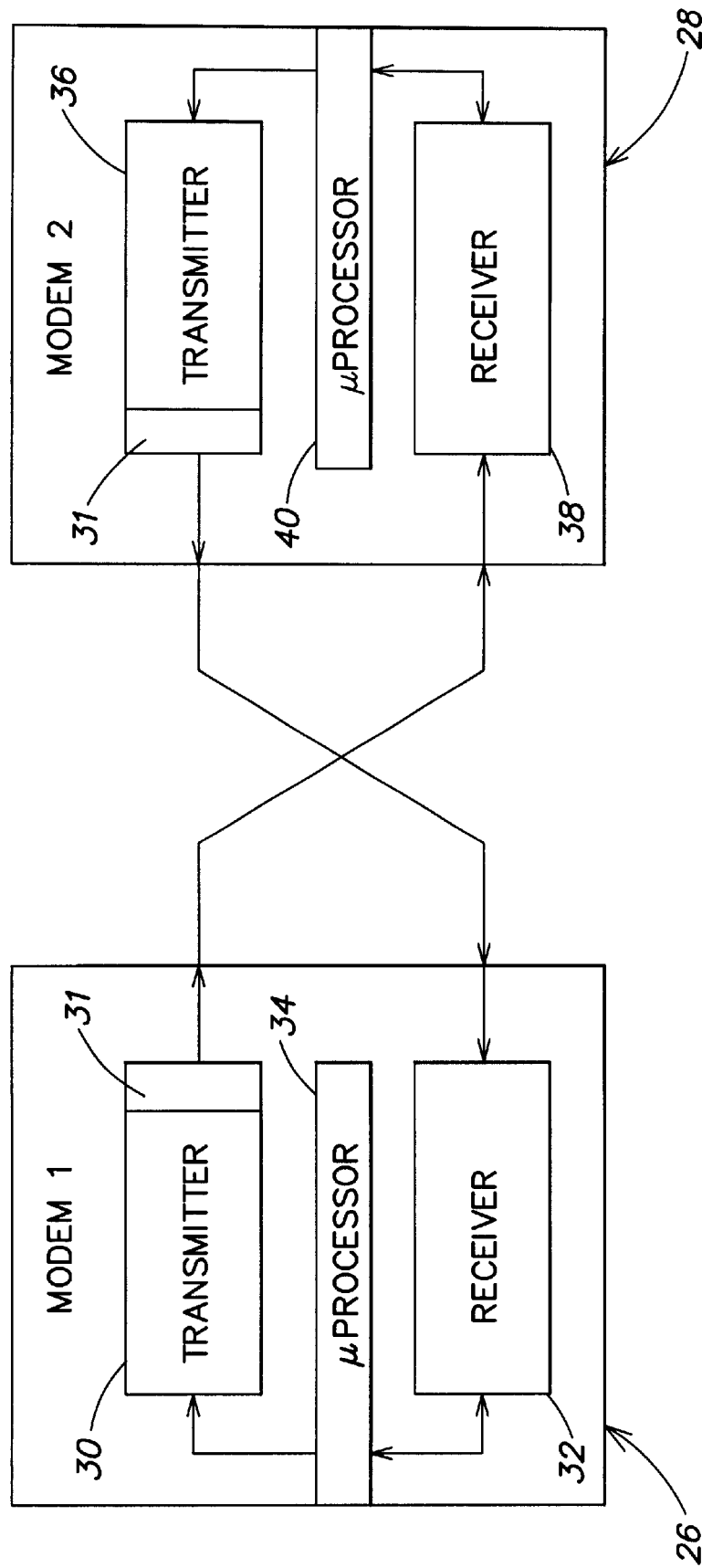
FIG. 2 is a schematic diagram illustrating interconnections for dynamic adaptive modulation negotiations between wireless modems according to the present invention.

FIG. 2 is a schematic diagram illustrating interconnections for dynamic adaptive modulation negotiations between wireless modems, according to the present invention. As illustrated in FIG. 2, a first wireless modem 26 transmits a signal to a second wireless modem 28, and receives a signal transmitted from the second wireless modem 28, and the second wireless modem 28 correspondingly transmits a signal to the first wireless modem 26, and receives a signal transmitted from the first wireless modem 26. The first wireless modem 26 includes a transmitter 30 that transmits the signal to the second wireless modem 28, a receiver 32 that receives the signal transmitted from the second wireless modem 28, and a microprocessor, microcontroller or controller 34 that receives parameters from the receiver 32 related to link quality of the signal, such as SNR, bit error rate, etc., which will be described below. The transmitter 30 includes an output buffer 31 that buffers data to be transmitted just prior to the transmission.

Similarly, the second wireless modem 28 includes a transmitter 36 that transmits a signal to the first wireless modem 26, a receiver 38 that receives the signal transmitted from the first wireless modem 26, and a microprocessor, microcontroller or controller 40 that receives parameters from the receiver 38 related to link quality of the signal, such as SNR, bit error rate, and so forth, as described below. The transmitter 36 includes an output buffer 31 that buffers data to be transmitted just prior to the transmission.

The transmitter 36, receiver 38, and controller 40 of the second wireless modem 28 are the same as the transmitter 30, receiver 32, and controller 34 of the first wireless modem 26.

As illustrated in FIG. 2, a signal transmitted from the transmitter 30 of the first wireless modem 26 is received by the receiver 38 of the second wireless modem 28. Information about the signal is output by the receiver 38 to the controller 40 and is processed by the controller 40 to control the transmitter 36 and receiver 38 of the second wireless modem 28. In the same way, a signal transmitted by the transmitter 36 of the second wireless modem 28 is received by the receiver 32 of the first wireless modem 26. Information about the signal is output by the receiver 32 to the controller 34 and is processed by the controller 34 to control the transmitter 30 and receiver 32 of the first wireless modem 26. In this way, a feedback loop is formed between the controller 34 of the first wireless modem 26 and the controller 40 of the second wireless modem 28.

Figure 3:
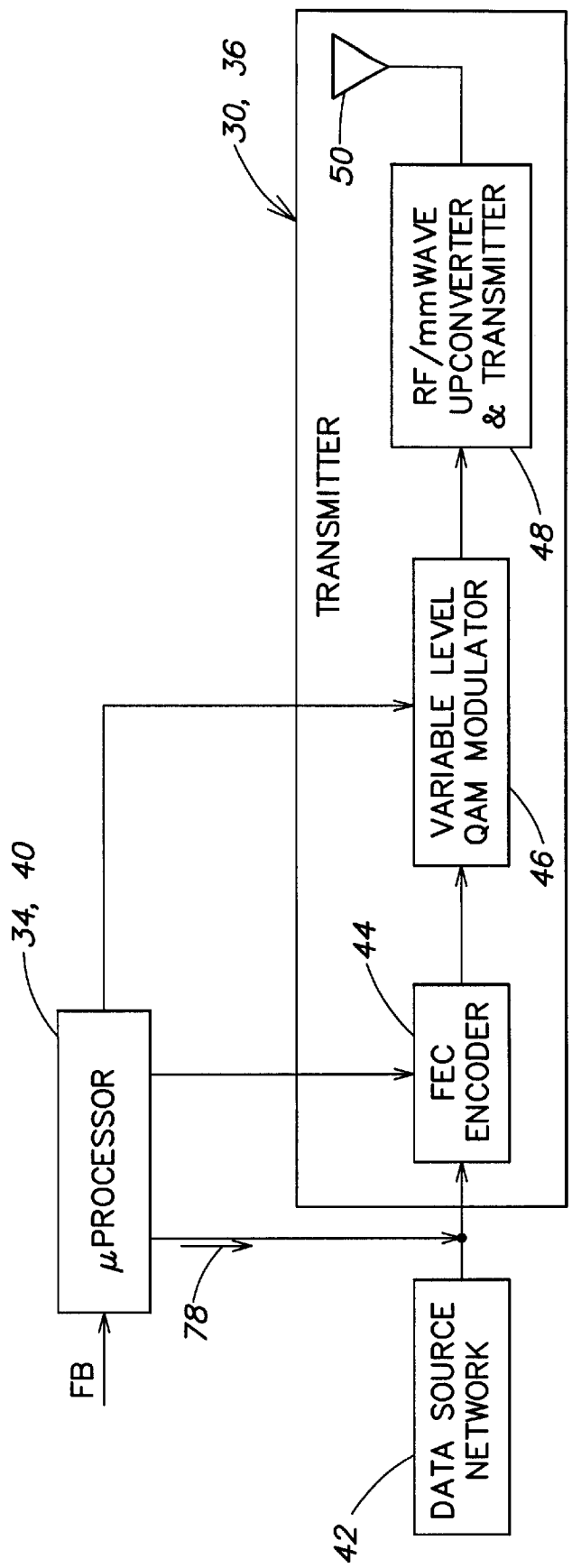
FIG. 3 is a block diagram of a transmitter according to the present invention that is included in the wireless modems of FIG. 2.

FIG. 3 is a block diagram of the transmitters 30, 36 according to the present invention. As illustrated in FIG. 3, in each respective transmitter 30, 36 of the wireless modems 26, 28 of the present invention, a signal from a data source network 42 of any type, such as a LAN, the Internet, telephony, video, etc., is received by a forward error correction unit 44, such as described, for example, in the 1960 article entitled "Polynomial Codes Over Certain Finite Fields", by I. S. Reed and G. Solomon incorporated by reference herein. The forward error correction unit 44, under control of the controller 34, 40, inserts error correction information into the signal and outputs a corresponding encoded signal. The amount of error correction can be variably controlled by the controller 34, 40. For example, the amount of channel capacity typically used for error correction is varied from one to ten percent.

The encoded signal output by the forward error correction unit 44 is input to a variable level quadrature amplitude modulation, or QAM modulation unit 46, such as, for example, a BCM3033 available from Broadcom Corporation. The QAM modulation unit 46, under control of the controller 34, 40 varies a modulation index of the signal and outputs a modulated signal. The modulated signal output by the QAM modulation unit 46 is received by a conventional RF millimeter wave upconverter and transmitter 48. Both the amount of error correction performed by the forward error correction unit 44 and the variation in the modulation index performed by the QAM modulation unit 46 is controlled based on feedback FB received, respectively, by the controllers 34, 40 from the receivers 32, 38 of the corresponding wireless modems 26 and 28, as will be described in detail below.

The modulated signal received by the upconverter and transmitter 48 of the first wireless modem 26, for example, is then transmitted through an antenna 50 of the transmitter 30 and received by the receiver 38 of the second wireless modem 28. In the same way, the modulated signal received by the upconverter and transmitter 48 of the second wireless modem 28 is transmitted through an antenna 50 of the transmitter 36 of the second wireless modem 28 and received by the receiver 32 of the first wireless modem 26.

The controller 34, 40 outputs a modulation index change command packet 78 requesting the modulation index to be changed to the forward error correction encoder 44 of the respective receiver 32, 38, as will be described below.

Figure 4:
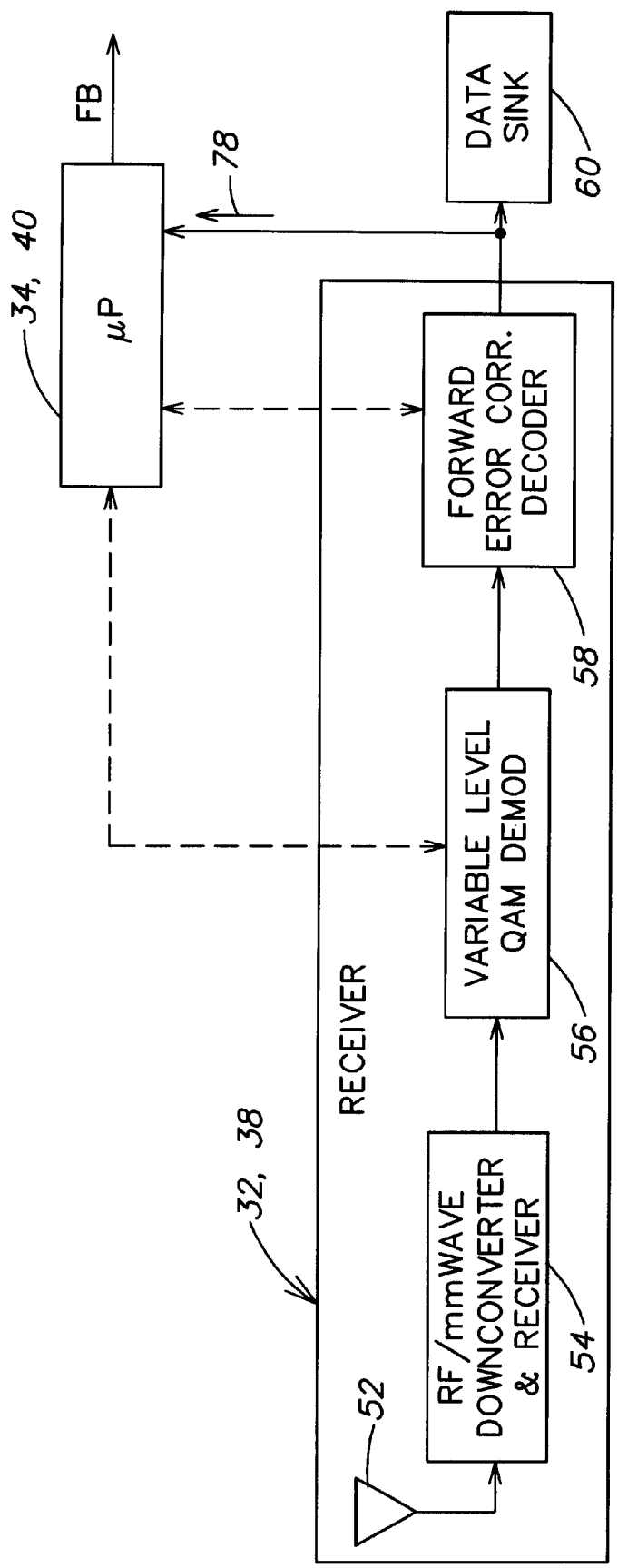
FIG. 4 is a block diagram of a receiver according to the present invention that is included in the wireless modems of FIG. 2.

FIG. 4 is a block diagram of the receivers 32, 38 according to the present invention. The receiver 32 of the first wireless modem 26 receives the signal transmitted from the transmitter 36 of the second wireless modem 28, and the receiver 38 of the second wireless modem 28 receives the signal transmitted from the transmitter 30 of the first wireless modem 26, and each receiver 32, 38 essentially performs the reverse process described previously with respect to the transmitters 30, 36.

In particular, as illustrated in FIG. 4, the signal transmitted from the antenna 50 of the corresponding transmitter 30, 36 is received by a conventional RF millimeter wave down converter 54 of the respective receiver 32, 38 through a corresponding antenna 52. The RF millimeter wave down converter 54 down converts the received signal and outputs a corresponding down converted signal to a variable level QAM demodulator unit 56, such as, for example, a BCM 3118 available from Broadcom Corporation. The QAM demodulator unit 56 demodulates the down converted signal received from the RF millimeter wave down converter 54 and outputs a corresponding demodulated signal to a forward error correction decoder 58, as described by I. S. Reed and G. Solomon in the 1960 article entitled "Polynomial Codes Over Certain Finite Fields". The forward error correction decoder 58 decodes the demodulated signal received from the QAM demodulator unit 56 and outputs a decoded signal to a data destination 60.

The QAM demodulator unit 56 also provides parameters related to the link quality of the signal, such as SNR, etc., to the controller 34. In addition, the forward error correction decoder 58 provides link quality parameters of the signal related to bit error rate (BER) to the controller 34. Based upon the value of these link quality related parameters, the controller 40 of the second wireless modem 28, for example, determines an appropriate modulation index and encoding of the signal. This determined level of modulation and encoding is then included as a modulation index change command packet 78 in the signal transmitted by the transmitter 36 of the second wireless modem 28 to the receiver 32 of the first wireless modem 26. The controller 34 of the first wireless modem 26 receives the modulation index change command packet 78 from the output of the forward error correction decoder 58 of the receiver 32 of the first wireless modem 26. As a result, the determined modulation index and encoding is fed back to the controller 34 of the first wireless modem 26, which then controls the QAM modulator 46 of the transmitter 30 of the first wireless modem 26 to change the level of modulation and/or encoding in the transmitter 30, accordingly.

In the same way, the controller 34 of the first wireless modem 26 determines an appropriate modulation index and encoding of the signal. This determined level of modulation and encoding is then included as a modulation index change command packet 78 in the signal transmitted by the transmitter 30 of the first wireless modem 26 to the receiver 38 of the second wireless modem 28. The controller 40 of the second wireless modem 28 receives the modulation index change command packet 78 from the output of the forward error correction decoder 58 of the receiver 38 of the second wireless modem 28. As a result, the determined modulation index and encoding is fed back to the controller 40 of the second wireless modem 28, which then controls the QAM modulator 46 of the transmitter 36 of the second wireless modem 28 the data to change the level of modulation and/or encoding in the transmitter 36, accordingly. The command packet can also be used to change the demodulation and decoding in the receiver, although such is not necessary as will be understood from the discussion of FIG. 5.

In this way, the wireless modem according to the present invention actively detects SNR and BER, and variably increases or decreases the modulation index and/or level of encoding based on the detected SNR and BER. For example, depending on whether environmental degradation is a factor, the modulation index can be increased from QPSK, which gives 2 bits per symbol, to 16 QAM that gives 4 bits per symbol, 32 QAM that gives 5 bits per symbol, or 64 QAM that gives 6 bits per symbol, or decreased from any one modulation index to another modulation index. Likewise, the percentage of the link used for error correction can be increased as the link degrades and decreased as the link improves.

There are discrete steps between the modulation indexes, and therefore the forward encoding of the forward error correction unit 44 is used to enable the transition between the decreases or increases in the modulation index to take place in a more controlled, smooth manner. For example, when the signal is degrading and a switch to a lower modulation index should be considered, rather than making the switch to a lower modulation index, the level of encoding can be increased, for example, from two to three bits of encoding used for error correction. This maintains the modulation index but decreases the bit throughput rate because of the increased encoding while maintaining link availability. When the maximum level of encoding is reached and further improvement in signal quality is necessary, the modulation index can be switched (lowered) and the encoding level decreased.

The reverse can also be accomplished where the encoding is decreased as the signal quality improves until the minimum encoding is used, at which time the modulation index can be increased, thereby increasing the throughput in a smoother fashion. As a result, the present invention achieves a more robust link having a variable lower throughput during periods of increased environmental degradation, and a variable greater throughput during periods of less environmental degradation. As a result, the present invention provides improved link characteristics between modems by varying the modulation index and/or encoding in response to changes in link quality as a result of environmental degradation or other non-transient man-made interference sources of the link.

Figure 5:
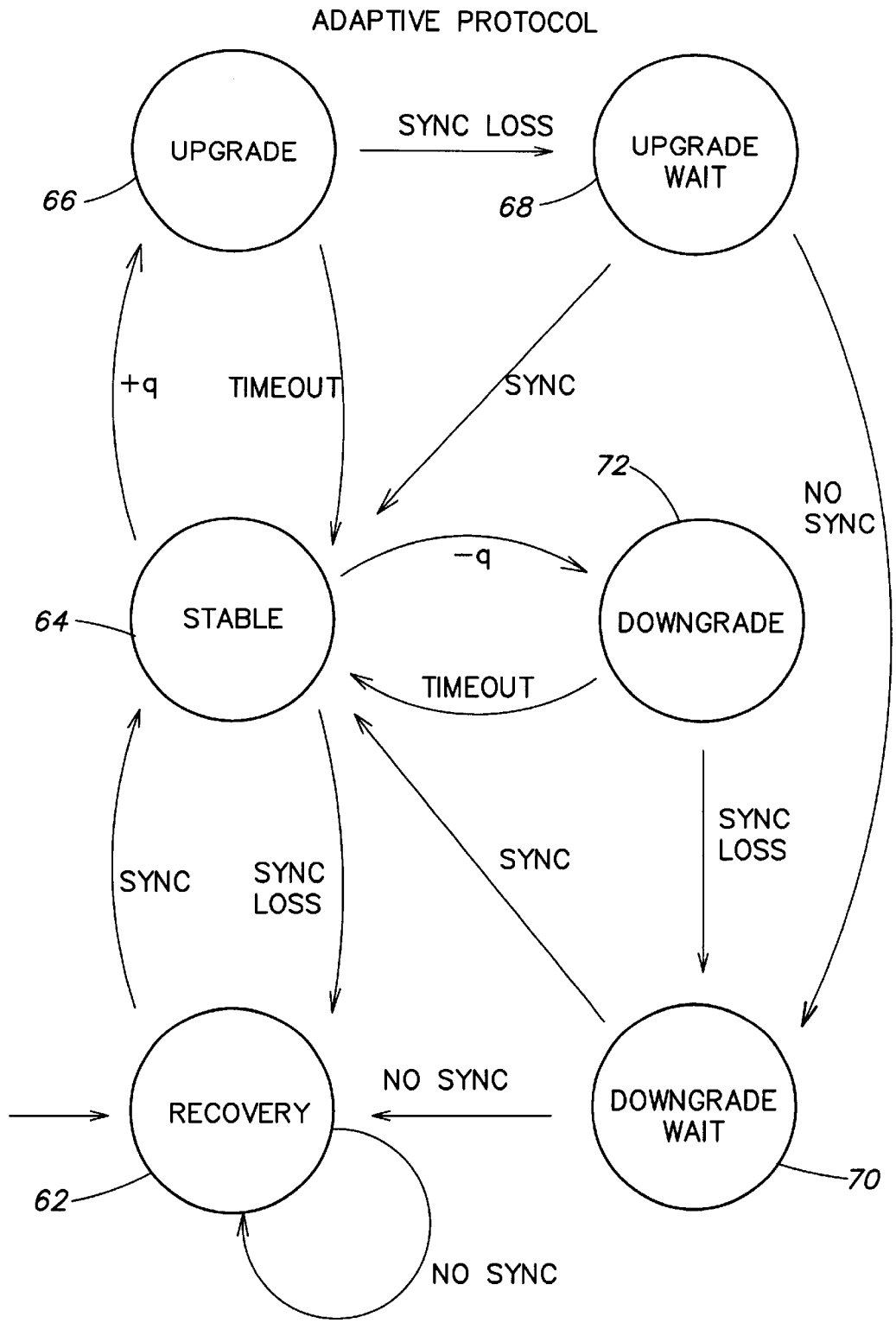
FIG. 5 is a receiver state transition diagram illustrating negotiation for point-to-point links that occurs on a receiver side according to the present invention.
Figure 6:
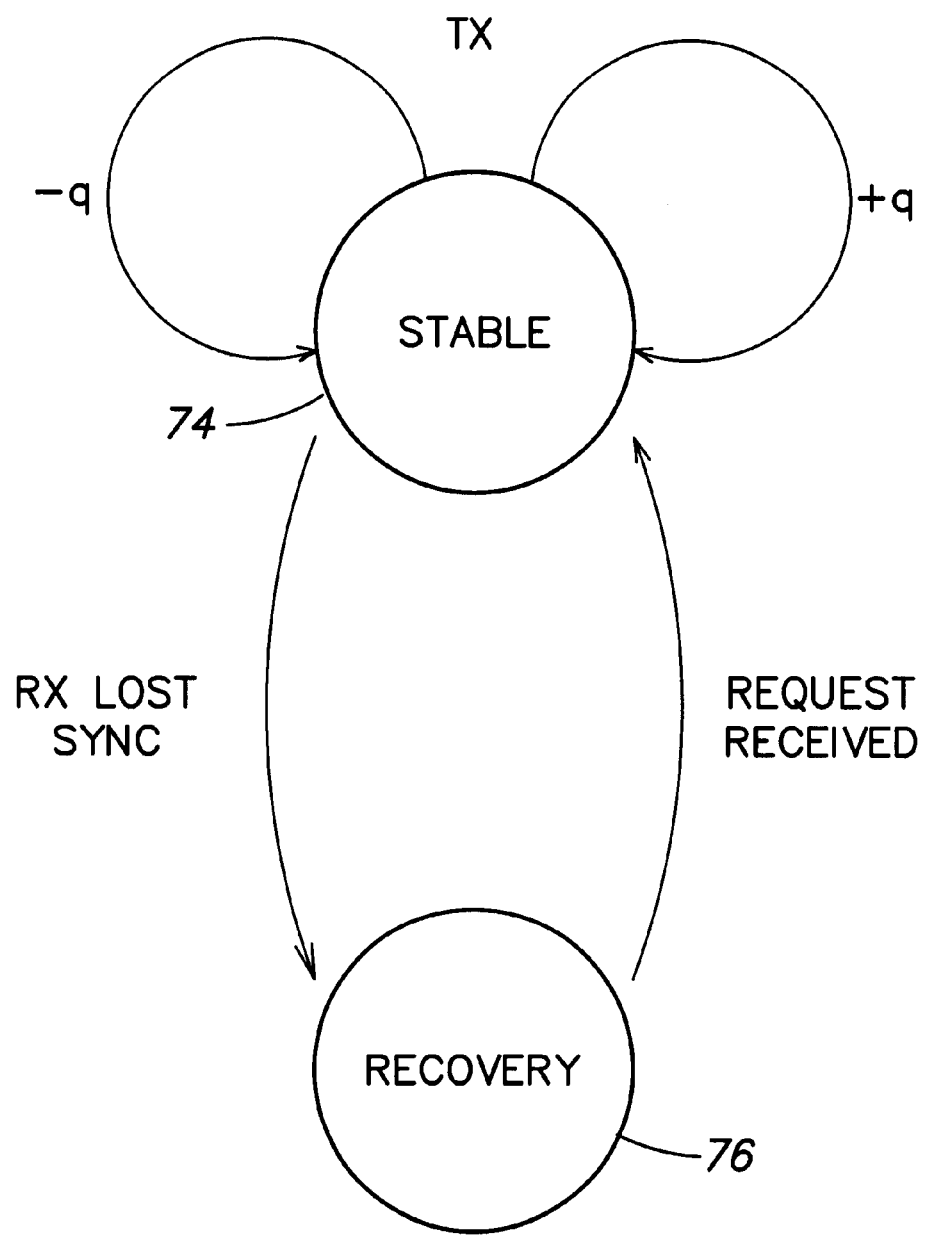
FIG. 6 is a transmitter state transition diagram illustrating negotiation for point-to-point links that occurs on a transmitter side according to the present invention.

FIG. 5 is a receiver state transition diagram illustrating the negotiation for point-to-point links that occurs on a receiver side of the signal when the modulation index and/or encoding is adjusted, according to the present invention. FIG. 6 is a transmitter state transition diagram illustrating the negotiation for point-to-point links that occurs on a transmitter side of the signal, according to the present invention.

In the description of the quadrature amplitude modulation negotiation for point-to-point links, according to the present invention, described in reference to FIGS. 5 and 6 below, it is assumed for the sake of simplicity that the receiver state transition diagram illustrated in FIG. 5 corresponds to the receiver 38 of the second wireless modem 28, and the transmitter state transition diagram illustrated in FIG. 6 corresponds to the transmitter 30 of the first wireless modem 26. At the same time, it is understood that the respective transmitters 30, 36 of the first and second wireless modems 26 and 28 each include the negotiation for point-to-point links illustrated in FIG. 6, and the respective receivers 32, 38 of the first and second wireless modems 26 and 28 each include the negotiation for point-to-point links illustrated in FIG. 5.

According to the present invention, the receiver 38 of the second wireless modem 28 receives a signal from the transmitter 30 of the first wireless modem 26 through the antenna 52. The QAM demodulator unit 56 receives and demodulates the signal and outputs the SNR, etc. to the controller 40, and the forward error correction decoder 58 receives and decodes the demodulated signal and outputs the corresponding bit error rate to the controller 40 to enable the controller 40 to determine whether the modulation index, or QAM index, should be increased or decreased. The determination of whether to increase or decrease the QAM index is dependent upon and varies according to field tests corresponding to a particular application. For example, typical SNR threshold values associated with each QAM index for determining upgrade QAM index eligibility have been determined to be a minimum SNR of 12.0 for QPSK, 18.0 for 16 QAM, 24.0 for 32 QAM, and 26.0 for 64 QAM. Minimum SNR values for 128 QAM and 256 QAM have been determined to be 27.0 and 28.0, respectively.

According to a preferred embodiment of the present invention, when the wireless modems 26 and 28 are initially turned on, synchronization ("sync") has not been achieved. Packets advertising the ability of each of the wireless modems to support a certain version of a protocol, which is typically automatic for standard link establishment, are transmitted at the lowest modulation index between the wireless modems 26 and 28. Therefore, when initially powered on, the second wireless modem 28 is in a recovery state 62, as illustrated in FIG. 5, and the state machine of the receiver 38 is not automatically initialized until sync is acquired and the packet is received from the first wireless modem 26 specifying the version of protocol that the first wireless modem 26 supports. In the same way, when initially powered on, the first wireless modem 26 is in the recovery state 62 and the state machine of the receiver 32 is not automatically initialized until sync is acquired and the packet is received from the second wireless modem 28 specifying the version of protocol that the second wireless modem 28 supports. Once this information is exchanged, the state machines in the wireless modems 26 and 28 are initialized and the corresponding transmitters 30, 36 are transmitting using the same QAM index.

As illustrated in FIG. 5, once the wireless modems 26 and 28 are initialized and have achieved sync, the respective receivers 32, 38 move from the recovery state 62 to a stable state 64. When in the stable state 64, the receivers 32, 38 continuously sample the line quality of the signal to determine whether to upgrade or downgrade the modulation index and/or encoding. For example, the controller 40 of the second wireless modem 28 receives the SNR parametric output by the QAM demodulator unit 56 of the receiver 38 in addition to the bit error rate parametric output by the forward error correction decoder 58 of the receiver 38 and, on the basis of the received parameters, determines that the line quality has not decreased as a result of environmental degradation. The controller 40 makes such a determination by comparing the difference in the current SNR to a previous SNR average, or to a SNR threshold, and determining that the link quality is clean, i.e. that there is a +q event.

Once a +q event is achieved when the receiver 38 is in the stable state 64, the controller 40 generates corresponding feedback information in the form of a modulation index change command packet 78 specifying an increased QAM index to which the receiver 38 intends to move. The receiver 38 of the second wireless modem 28 then moves from the stable state 64 to an upgrade state 66. While in the upgrade state 66, the second wireless modem 28 continues to receive and transmit data at the initial QAM index so that data transmission is not affected by the transmission of the modulation index change command packet 78.

The controller 40 outputs the modulation index change command packet 78 to the forward error correction encoder 44 of the transmitter 36 of the second wireless modem 28 which then transmits the modulation index change command packet 78 to the receiver 32 of the first wireless modem 26. The controller 34 of the first wireless modem 26 receives the modulation index change command packet 78 after it is forward error correction decoded by the forward error correction decoder 58 of the first wireless modem 26.

If the modulation index change command packet 78 is received by the receiver 32 of the first wireless modem 26, the transmitter 30 of the first wireless modem 26 stops placing data in the output buffer 31, and data that remains to be transmitted in the output buffer 31 of the transmitter 30 is transmitted. The first wireless modem 26 then flushes out the output buffer 31 of the transmitter 30 and as soon as the last data element is sent, the controller 34 controls the QAM modulator 46 of the first wireless modem 26 to upgrade its modulation index to correspond to the increased QAM index, and then resumes transmitting data. When data transmission by the first wireless modem 26 is resumed, the resumed data transmission initially includes empty frames for a certain period of time, such as 20 ms, for example.

When the modulation index is upgraded by the QAM modulator 46 of the first wireless modem 26, the link between the first wireless modem 26 and the second wireless modem 28 is momentarily lost, resulting in a sync loss event. As soon as the sync loss event occurs, the controller 40 controls the QAM demodulator of the receiver 38 to upgrade the modulation index to correspond to the upgraded QAM index requested in the modulation index change command packet, and the receiver 38 of the second wireless modem 28 moves to an upgrade wait state 68. Since the first wireless modem 26 is already transmitting empty frames at the upgraded QAM index, a sync event occurs. Once this sync event occurs, the receiver 38 moves from the upgrade wait state 68 to the stable state 64 and continues sampling the line quality.

If the sync loss event does not occur while in the upgrade state 66, i.e., the modulation index is not upgraded by the QAM demodulator 56 of the second wireless modem 28 and therefore the link between the first wireless modem 26 and the second wireless modem 28 is not momentarily lost, the receiver 38 of the second wireless modem 28 moves from the upgrade state 66 to the stable state 64 after preferably a one second timeout event. The receiver 38 then resumes sampling the line quality. During this time, neither the first wireless modem nor the second wireless modem 28 stop receiving or transmitting data, and therefore no loss in data transmission has resulted.

When the receiver 38 is in the upgrade state 66 and achieves the sync loss event, the receiver moves to the upgrade wait state 68 to wait for the receipt of the empty frames from the transmitter 30 of the first wireless modem 26. If the receiver 38 does not receive the empty frames while in the upgrade wait state 68, or the empty frames are received in a degraded condition, a no sync event occurs.

In response to the no sync event that occurs while the receiver 38 is in the upgrade wait state 68, the receiver 38 instructs the controller 40 of the second wireless modem 28 to generate a modulation index change command packet 78 specifying the previous modulation index, and the receiver 38 moves from the upgrade wait state 68 to a downgrade wait state 70 after changing to the previous modulation index. As described above, the controller 40 generates and outputs the modulation index change command packet 78 to the forward error correction encoder 44 of the transmitter 36 of the second wireless modem 28 and the modulation index change command packet 78 is transmitted to the receiver 32 of the first wireless modem 26. The controller 34 of the first wireless modem 26 receives the modulation index change command packet 78 after it is forward error correction decoded by the forward error correction decoder 58 of the first wireless modem 26. If the modulation index change command packet 78 is received by the receiver 32 of the first wireless modem 26, the transmitter 30 of the first wireless modem 26 ensures that the output buffer 31 is flushed out, changes its modulation index accordingly, and then transmits data including the empty frames as described above.

If a sync event occurs after the receiver 38 of the second wireless modem 28 moves to the downgrade wait state 70, meaning that the transmitter 30 of the first wireless modem 26 is now transmitting at the previous modulation index, the receiver 38 moves to the stable state 64 and continues sampling the line quality.

If the receiver 38 of the second wireless modem 28 moves from the upgrade wait state 68 to the downgrade wait state 70 as described above, and a sync event does not occur, meaning that the transmitter 30 of the first wireless modem 26 is not transmitting at the previous modulation index after preferably one second, a no sync event occurs and the receiver 38 of the second wireless modem 28 moves to the recovery state 62. In the recovery state 62, the receiver 38 of the second wireless modem 28 instructs the controller 40 of the second wireless modem 28 to generate a modulation index change command packet 78 specifying the lowest QAM index and to immediately change the receiver 38 to the lowest QAM index without waiting for a response from the first wireless modem.

If a sync event occurs after the receiver 38 of the second wireless modem 28 moves from the downgrade wait state 70 to the recovery state 62, meaning that the transmitter 30 of the first wireless modem 26 is transmitting at the lowest QAM index, the receiver 38 moves from the recovery state 62 to the stable state 64 and continues sampling the line quality. On the other hand, if a no sync event occurs after the receiver 38 of the second wireless modem 28 moves from the downgrade wait state 70 to the recovery state 62, meaning that the transmitter 30 of the first wireless modem 26 is not transmitting at the lowest QAM index, both the transmitter 36 and the receiver 38 of the second wireless modem 28 are reset or initialized.

When the transmitter 36 of the second wireless modem 28 is reset, the receiver 32 of the first wireless modem 26, which is in the stable state 64, experiences a sync loss event, since the line goes down momentarily, and therefore immediately goes to the recovery state 62 and the transmitter 30 and receiver 32 of the first wireless modem 26 are reset, as described above. As a result, the effect of resetting the transmitter 36 and receiver 38 of the second wireless modem 28 when a no sync event occurs while in the recovery state 62 is that the transmitter 30 and receiver 32 of the first wireless modem 26 are reset as well, so that both wireless modems 26, 28 are at the lowest available QAM index and attempting to attain sync, similar to when the wireless modems 26, 28 are powered on, as described above.

If, on the other hand, while sampling the line quality in the stable state 64 by comparing the difference in the current SNR output by the QAM demodulator unit 56 of the receiver 38 to a previous SNR average, or to a SNR threshold, the controller 40 of the second wireless modem 28 determines that the line quality is degrading as a result of environmental degradation of the link, a −q event occurs. In response to the −q event that occurs while the receiver 38 is in the stable state 64, the controller 40 generates corresponding feedback information in the form of a modulation index change command packet 78 specifying a decreased QAM index to which the receiver 38 intends to move and the receiver 38 moves from the stable state 64 to a downgrade state 72. The controller 40 outputs the modulation index change command packet 78 to the forward error correction encoder 44 of the transmitter 36 and the modulation index change command packet 78 is transmitted to the receiver 32 of the first wireless modem 26. The controller 34 of the first wireless modem 26 receives the modulation index change command packet 78 after it is forward error correction decoded by the forward error correction decoder 58 of the first wireless modem 26. While in the downgrade state 72, the second wireless modem 28 continues to receive and transmit data at the initial QAM index so that data transmission is not effected by the transmission of the modulation index change command packet 78.

In the same way as in the upgrade state 66 described above, when the modulation index change command packet 78 is received by the receiver 32 of the first wireless modem 26 after a −q event occurs while the receiver 38 is in the stable state 64, the transmitter 30 of the first wireless modem 26 stops sending data, flushes out the output buffer 31 of the transmitter 30, and as soon as the last data element is sent, the controller 34 controls the QAM modulator 46 of the first wireless modem 26 to downgrade its modulation index to correspond to the decreased QAM index, and then resumes transmitting data, beginning with empty frames.

When the modulation index is downgraded by the QAM modulator 46 of the first wireless modem 26, the link between the first wireless modem 26 and the second wireless modem 28 is momentarily lost, resulting in a sync loss event. As soon as the sync loss event occurs, the controller 40 controls the QAM demodulator of the receiver 38 to downgrade the modulation index of the receiver 38 to correspond to the downgrade QAM index requested in the modulation index change command packet 78, and the receiver 38 of the second wireless modem 28 moves from the downgrade state 72 to the downgrade wait state 70. Since the first wireless modem 26 is already transmitting empty frames at the downgraded QAM index, a sync event occurs. Once this sync event occurs, the receiver 38 moves from the downgrade wait state 70 to the stable state 64 and continues sampling the line quality.

While the receiver 38 is in the downgrade state 72, if the sync loss event does not occur, i.e., the modulation index is not downgraded by the QAM modulator 46 of the first wireless modem 26 and therefore the link between the first wireless modem 26 and the second wireless modem 28 is not momentarily lost, a timeout event occurs, and the receiver 38 of the second wireless modem 28 moves from the downgrade state 72 to the stable state 64 and resumes sampling the line quality. During this time, neither the first wireless modem nor the second wireless modem 28 stop receiveing or transmitting data, and therefore no loss in data transmission has resulted.

Once the sync loss event occurs and the receiver 38 of the second wireless modem 28 moves from the downgrade state 72 to the downgrade wait state 70, the state transition of the receiver 38 is the same as in the case when the receiver 38 moves from the upgrade wait state 68 to the downgrade wait state 70 after a no sync event occurs while in the upgrade wait state 68, described above, and therefore the repeated description will be omitted.

Finally, while sampling the line quality in the stable state 64, if the receiver 38 no longer detects the signal, or loses sync, without initiating the loss of sync, such as during a loss of sync resulting from an event outside protocol, a sync loss event occurs. Once this sync loss event occurs, the receiver 38 moves directly from the stable state 64 to the recovery state 62. While such an occurrence would be rare, once the receiver 38 is in the recovery state 62 as a result of an event outside protocol, the receiver 38 commands the controller 40 to reset both the receiver 38 and the transmitter 36. This action forces the link between the transmitter and the receiver to momentarily go down, which communicates the controller to reconfigure the transmitter and receiver to be at the minimum QAM index, as described above.

If at recovery state the no sync event is received, the receiver 38 takes the same action as described above; that is, the receiver 38 and transmitter 36 are reset (reconfigured) which in turn resets the remote modem 26 to do the same. This way, in the recovery state both modems constantly try to achieve sync at the lowest QAM level.

As illustrated in FIG. 6, the state diagram for the transmitter 30 includes a stable state 74 and a recovery state 76. Once initialization of the wireless modems is performed as described above, and the transmitter 30 is therefore in the stable state 74 and continuously transmits data at the particular QAM index determined by the protocol during initialization. The transmitter 30 remains at that particular QAM index until the above-described feedback information is received from the second wireless modem 28 requesting the first wireless modem 26 to change QAM index. Upon receipt of the feedback information, the transmitter 30 changes to a QAM index corresponding to the feedback information that in turn is related to whether the line quality is determined to be degrading −q, or clean +q, as described above. The transmitter 30 after changing the QAM index simply returns to the stable state where is ready to receive feedback information again. When the transmitter 30 of the first wireless modem 26 is reset and configured to the lowest QAM index as a result of the receiver 38 of the second wireless modem 28 losing sync, the transmitter 30 moves to the recovery state 76. Once the transmitter 30 receives feedback information requesting some QAM index, the transmitter moves to the stable state 74 and transmits data.

By using the dynamic adaptive modulation negotiation according to the present invention described above, the present invention enables wireless modems to make use of the increased SNR corresponding to the hashed region of the graph of FIG. 1 located between where the SNR can be tolerated, line 24, and the engineered level of the SNR, line 20. As a result, the modems of the present invention are able to successfully maintain a link in periods of environmental degradation, such as during periods of intense rainfall, while allowing the modems to operate with greater throughput during the time of the year when environmental degradation does not occur. In addition, since the wireless modems 26, 28 continue to transmit and receive data while the modulation negotiation takes place, negotiation of the signal received is performed transparent to the payload, thereby minimizing the impact of the negotiation on data transmitted along the carrier signal.

It will be understood that while the embodiment of the present invention is described in association with modems operating at millimeter wave frequencies, the present invention could also apply to modems operating at lower frequencies.

While the negotiation for point-to-point links of the present invention are described in terms of negotiating a modulation index, it is understood that the negotiation is not limited to modulation index, but could also involve other features of the transmitted data, such as bandwidth, Reed-Solomon correction bytes, carrier frequency, convolution code rate, antenna beam focus, and excess bandwidth, etc. In addition, while the modulation negotiation has been described in relation to wireless communications, the modulation negotiation of the present invention could also applied in cable communications, and stratospheric links provided by high altitude aircraft and satellites.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A device for transmitting a first signal to a remote device and receiving a second signal transmitted from the remote device, comprising:

a transmitting unit to generate the first signal transmitted to the remote device;

a receiving unit to receive the second signal transmitted from the remote device, to output remote modulation variation information included in the second signal, and to generate link quality information corresponding to the second signal; and a control unit to generate a modulation change command packet instructing the remote device to change to a first quadrature amplitude modulation index corresponding to the link quality information, and to variably control the generation of the first signal by the transmitting unit according to the remote modulation variation information output from the receiving unit.

2. The device of claim 1, wherein the link quality information corresponds to environmental degradation of the second signal.

3. The device of claim 1, wherein the first quadrature amplitude modulation index is increased if the link quality information indicates an improvement in the quality of the second signal.

4. The device of claim 1, wherein the first quadrature amplitude modulation index is decreased if the link quality information indicates a degradation in the quality of the second signal.

5. The device of claim 1, wherein the transmitting unit comprises:

a forward error correction encoder unit to insert forward error correction information into a data signal and to output a corresponding encoded signal; and a modulation unit to variably modulate the encoded signal and to output a modulated signal, having a corresponding second quadrature amplitude modulation index, as the first signal transmitted to the remote device, wherein the control unit variably controls the inserted forward error correction information and the second quadrature amplitude modulation index based on the remote modulation variation information output from the receiving unit.

6. The device of claim 1, wherein the receiving unit comprises:
   a demodulating unit to demodulate the second signal transmitted from the remote device and to output a corresponding demodulated signal; and
   a forward error correction decoder unit to decode the demodulated signal received from the demodulating unit and to output a corresponding decoded signal,
   wherein the demodulating unit and the forward error correction decoder unit generate the link quality information.

7. The device of claim 6, wherein the link quality information generated by the demodulating unit relates to signal-to-noise ratio, and the link quality information generated by the forward error correction decoder unit relates to bit error rate.

8. The device of claim 1, wherein the remote modulation variation information includes a second modulation change command packet.

9. A wireless modem for transmitting a first signal to a remote device and receiving a second signal transmitted by the remote device, comprising:
   a forward error correction encoder unit to insert forward error correction information into the first signal transmitted by the wireless modem and to output a corresponding encoded signal;
   a modulation unit to variably modulate the encoded signal and to output a modulated signal having a corresponding first quadrature amplitude modulation index as the first signal transmitted to the remote device;
   a demodulating unit to demodulate the second signal transmitted by the remote device and output a corresponding demodulated signal;
   a forward error correction decoder unit to decode the demodulated signal received from the demodulating unit and to output a corresponding decoded signal; and
   a control unit to generate a modulation change command packet instructing the remote device to change a second quadrature amplitude modulation index corresponding to link quality information, and to variably control the inserted forward error correction information and the first quadrature amplitude modulation index based on remote modulation variation information included in the second signal received from the remote device, wherein the demodulating unit and the forward error correction decoder unit generate the link quality information.

10. The wireless modem of claim 9, wherein the link quality information generated by the demodulating unit relates to signal-to-noise ratio, and the link quality information generated by the forward error correction decoder unit relates to bit error rate.

11. The wireless modem of claim 10, wherein the link quality information corresponds to environmental degradation of the signal.

12. The wireless modem of claim 11, wherein the second quadrature amplitude modulation index is increased if the link quality information indicates an improvement in the quality of the second signal.

13. The wireless modem of claim 12, wherein the second quadrature amplitude modulation index is decreased if the link quality information indicates a degradation in the quality of the second signal.

14. The device of claim 9, wherein the remote modulation variation information includes a second modulation change command packet.

15. A method of negotiating modulation along a link between a transmitter and a receiver, comprising:
   sampling the link and generating first feedback information instructing the transmitter to change quadrature amplitude modulation in response to environmental degradation occurring along the entire link;
   generating second feedback information instructing the transmitter to change to an initial quadrature amplitude modulation in response to the transmitter not changing quadrature amplitude modulation in response to the first feedback information;
   generating third feedback information instructing the transmitter to change to a lowest quadrature amplitude modulation and changing the receiver to the lowest quadrature amplitude modulation in response to the transmitter not changing to the initial quadrature amplitude modulation in response to the second feedback information; and
   re-setting the receiver in response to the transmitter not changing to the lowest quadrature amplitude modulation in response to the third feedback information.

16. A method for transmitting a first signal to a remote device and for receiving a second signal transmitted from the remote device, the second signal including remote modulation variation information, the method comprising acts of:
   a) extracting the remote modulation variation information from the second signal;
   b) generating link quality information corresponding to the second signal;
   c) generating a modulation change command packet instructing the remote device to change a first quadrature amplitude modulation index based on the link quality information; and
   d) variably controlling the first signal according to the remote modulation variation information.

17. The method of claim 16, wherein the remote modulation variation information includes a second modulation change command packet, and wherein:
   the act c) includes an act of generating a first modulation change command packet instructing the remote device to change the first quadrature amplitude modulation index based on the link quality information; and
   the act d) includes an act of variably controlling the first signal according to the second modulation change command packet.

18. The method of claim 16, wherein the link quality information corresponds to environmental degradation of the second signal.

19. The method of claim 16, wherein the act of c) includes an act of:
   increasing the first quadrature amplitude modulation index if the link quality information indicates an improvement in the quality of the second signal.

20. The method of claim 16, wherein the act of c) includes an act of:
   decreasing the first quadrature amplitude modulation index if the link quality information indicates a degradation in the quality of the second signal.

21. The method of claim 16, wherein the act d) comprises acts of:

d1) inserting forward error correction information into a data signal and outputting a corresponding encoded signal;

d2) modulating the encoded signal and outputting a modulated signal, having a corresponding second quadrature amplitude modulation index, as the first signal transmitted to the remote device; and d3) variably controlling at least one of the inserted forward error correction information and the second quadrature amplitude modulation index based on the remote modulation variation information.

22. The method of claim 21, wherein the remote modulation variation information includes a second modulation change command packet, and wherein:

the act c) includes an act of generating a first modulation change command packet instructing the remote device to change the first quadrature amplitude modulation index based on the link quality information; and the act d3) includes an act of variably controlling at least one of the inserted forward error correction information and the second quadrature amplitude modulation index according to the second modulation change command packet.

23. The method of claim 22, wherein the second modulation change command packet includes at least one of the inserted forward error correction information and the second quadrature amplitude modulation index.

24. The method of claim 16, wherein the act b) comprises acts of:

b1) demodulating the second signal and outputting a corresponding demodulated signal;

b2) decoding the demodulated signal and outputting a corresponding decoded signal; and b3) generating the link quality information based on at least one of the act of demodulating and the act of decoding.

25. The method of claim 24, wherein the act b3) includes acts of:

generating signal-to-noise ratio information based on the act of demodulating; and generating bit error rate information based on the act of decoding.

26. A method for transmitting a first signal to a remote device and receiving a second signal transmitted by the remote device, the method comprising acts of:

a) inserting forward error correction information into a data signal and outputting a corresponding encoded signal;

b) modulating the encoded signal and outputting a modulated signal having a corresponding first quadrature amplitude modulation index as the first signal;

c) demodulating the second signal and outputting a corresponding demodulated signal;

d) decoding the demodulated signal and outputting a corresponding decoded signal;

e) generating a modulation change command packet instructing the remote device to change a second quadrature amplitude modulation index based on link quality information associated with the second signal; and f) variably controlling the first signal according to remote modulation variation information included in the second signal.

27. The method of claim 26, further including an act of:

g) generating the link quality information based on at least one of the act of demodulating and the act of decoding.

28. The method of claim 27, wherein the act g) includes acts of:

generating signal-to-noise ratio information based on the act of demodulating; and generating bit error rate information based on the act of decoding.

29. The method of claim 26, wherein the act e) includes an act of increasing the second quadrature amplitude modulation index if the link quality information indicates an improvement in the quality of the second signal.

30. The method of claim 26, wherein the act e) includes an act of decreasing the second quadrature amplitude modulation index if the link quality information indicates a degradation in the quality of the second signal.

31. The method of claim 26, wherein the act f) includes an act of:

f1) variably controlling at least one of the forward error correction information and the first quadrature amplitude modulation index based on the remote modulation variation information.

32. The method of claim 31, wherein the remote modulation variation information includes a second modulation change command packet, and wherein:

the act e) includes an act of generating a first modulation change command packet instructing the remote device to change the second quadrature amplitude modulation index based on the link quality information associated with the second signal; and the act f1) includes an act of variably controlling at least one of the forward error correction information and the first quadrature amplitude modulation index according to the second modulation change command packet.

33. The method of claim 32, wherein the second modulation change command packet includes at least one of the inserted forward error correction information and the second quadrature amplitude modulation index.

* * * * *